Nov. 22, 1960 R. A. MacMILLAN 2,961,603
METHOD AND MEANS FOR TESTING MAGNETIC PROPERTIES OF TOROID CORES
Filed Aug. 2, 1956 2 Sheets-Sheet 1
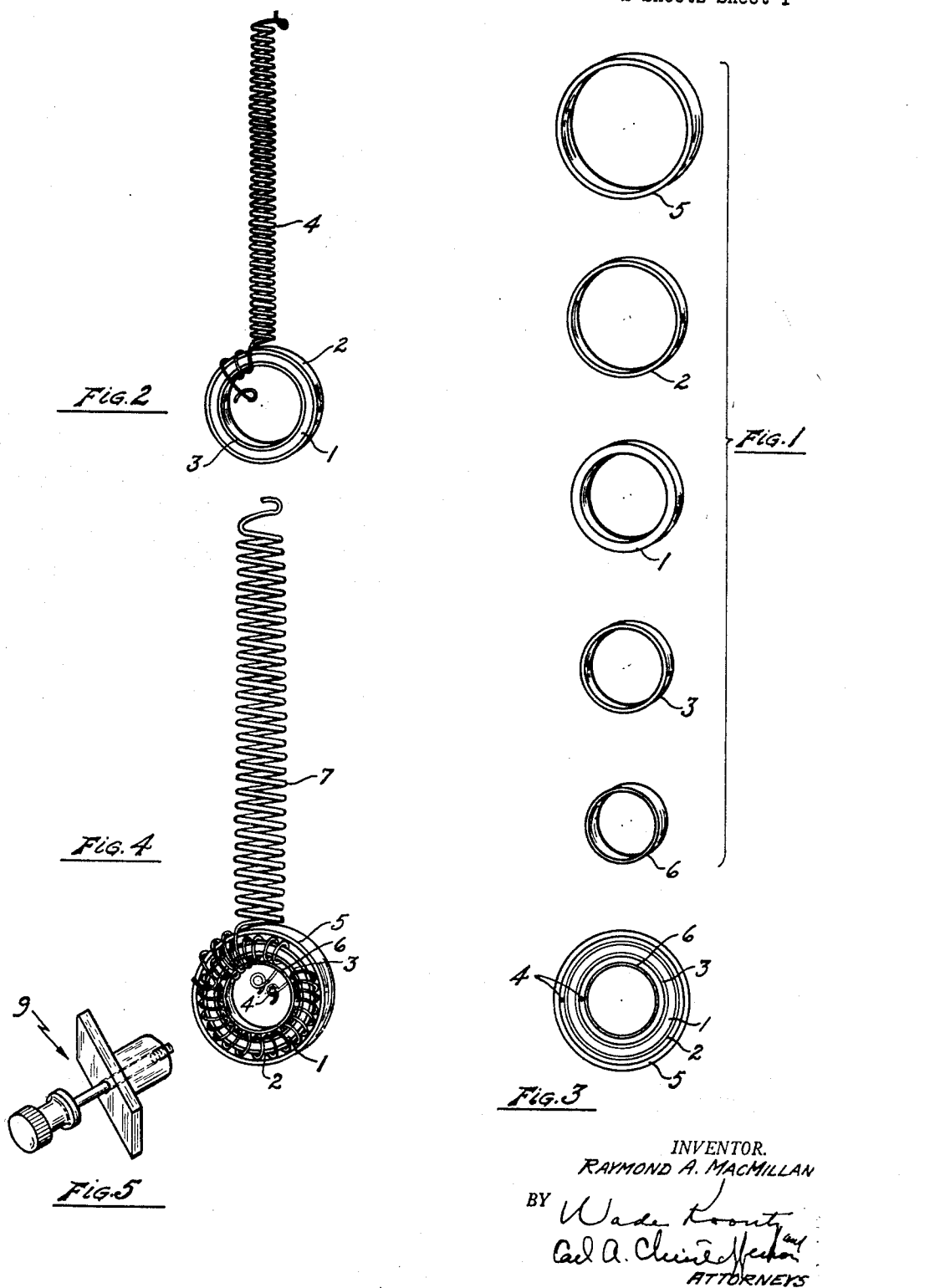
INVENTOR.
RAYMOND A. MACMILLAN
BY
ATTORNEYS

United States Patent Office 2,961,603
Patented Nov. 22, 1960

2,961,603

METHOD AND MEANS FOR TESTING MAGNETIC PROPERTIES OF TOROID CORES

Raymond A. MacMillan, Wakefield, Mass., assignor to the United States of America as represented by the Secretary of the Air Force Filed Aug. 2, 1956, Ser. No. 601,851

6 Claims. (Cl. 324—34)

(Granted under Title 35, U.S. Code (1952), sec. 266)

The invention described herein may be manufactured and used by or for the United States Government for governmental purposes without payment to me of any royalty thereon.

This invention relates generally to methods of preparing sample materials for testing the magnetic characteristics and more particularly to an improved method of applying windings to toroidal shaped sample materials.

In order to take measurements of magnetic materials, such material is often formed in the shape of a ring or toroid. These ring samples are then wound with a layer of insulating tape and two or more windings of wire are put over the tape. When many different material compositions are formed into rings of uniform size, each must have electrical windings applied and removed for evaluation and tests. This process is tedious and time-consuming even if accomplished with the aid of a toroid winding machine. Furthermore, a toroid winding machine does not always accommodate the large difference in wire diameter that would be convenient to use for magnetic measurements.

The object of my invention is to provide a plurality of windings which can be quickly applied to and removed from a sample core.

Another object of this invention is to provide a plurality of coils whose electrical characteristics have been carefully predetermined, to render such coils suitable for application to a series of magnetic core specimens, for successive testing thereof.

A further object of this invention is to provide a plurality of coils which include secondary or detector windings, such windings being preformed helices for application to toroidal specimens for magnetic tests.

These and other advantages, features and objects of the invention will become more apparent from the following description taken in connection with the illustrative embodiments in the accompanying drawings, wherein:

Fig. 1 shows separately the toroidal sample and concentric insulators;

Fig. 2 shows the first stage of assembly with partial application of the detector winding;

Fig. 3 shows a plan view in cross section of the sample after application of the detector winding and insulators;

Fig. 4 shows the second stage of assembly with partial application of the primary winding;

Fig. 5 is the thumb screw clamping bar used in mounting the coils; and

Figure 6:
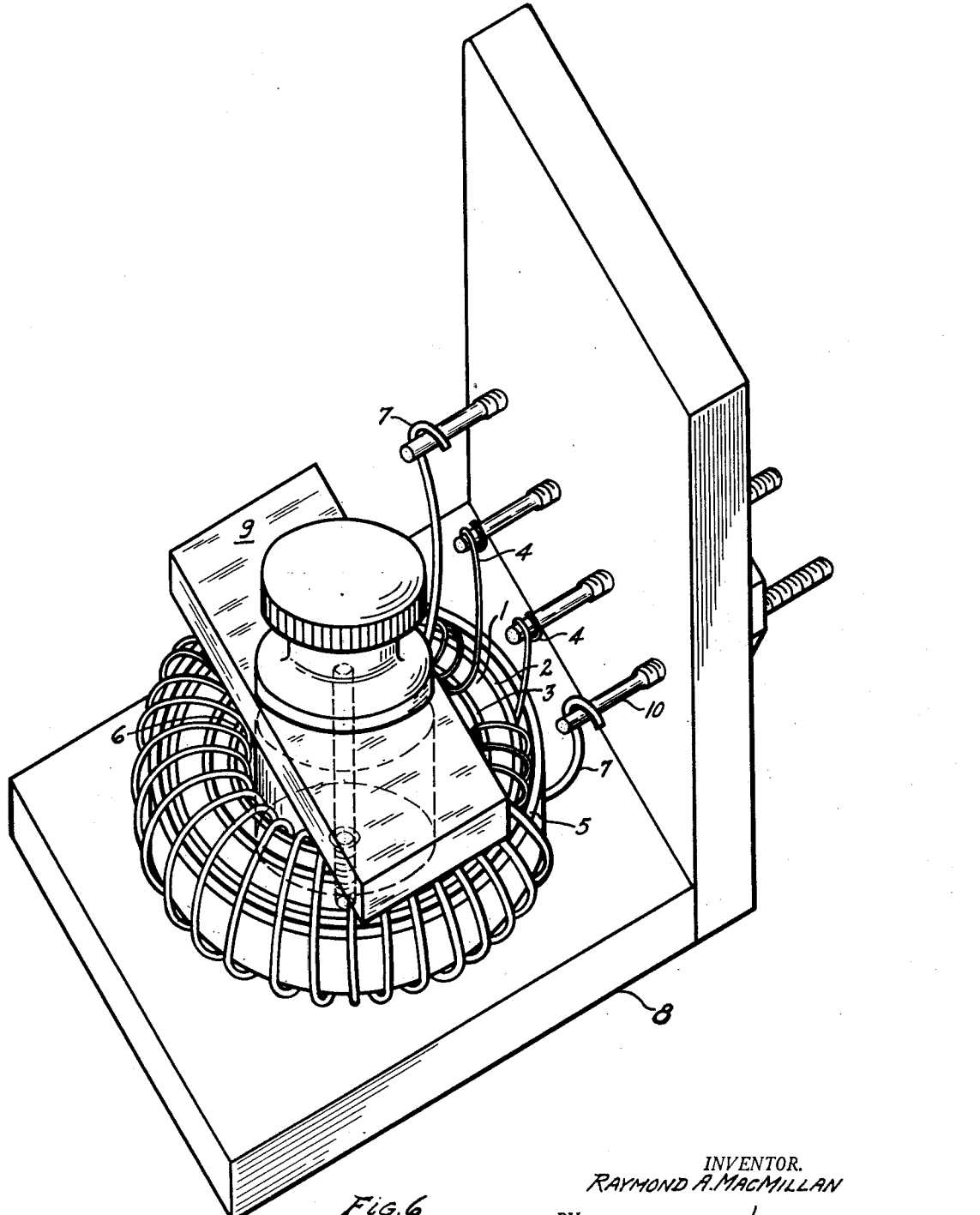
Fig. 6 shows the device completely mounted and in operative form.

As will be clear from the drawings, the magnetic core sample 1 is surrounded by two insulator rings 2 and 3 which fit the inside and outside peripheries of the core sample 1 snugly. The insulator rings 2 and 3 may be made of Teflon about 0.05" thick which was chosen in laboratory tests as the material for the insulating rings to support the winding springs 4 and 7 because of its low coefficient of friction together with its mechanical strength and its excellent electrical characteristics. The anti-friction characteristic of this material allows easy threading of close fitting windings of fine wire and many turns. An alternative method would be the use of Teflon-covered spring wire which would have the advantage of permitting the turns to be in contact allowing more turns to be used and eliminating the first two insulating rings 2 and 3.

The windings are made of a substance such as preformed Phosphor bronze springs which are threaded over the Teflon insulators inclosing the core samples. In laboratory tests the secondary or detector winding 4 was a 50 turn winding made of 0.020" spring wire wound on a 9/32" rod with 54 turns to the inch. The primary winding 7 was made of 0.050" spring wire wound on a 1/2" rod with a spacing equal to the diameter of the wire. These spring windings 4 and 7 have low electrical resistance, are non-magnetic and withstand large distortions with no permanent change in shape. They can be threaded on and off the core samples many times without loss of shape. The spring diameter can be determined by trial based on the material used. Too small a diameter makes threading difficult and causes permanent distortion in the spring; too large a diameter makes a bulky assembly and decreases the spacing of the winding from the core sample. This excess spacing is not desirable, particularly in the winding which supplies the measuring instrument because of the possibility of error due to stray fields. This consideration is not so important for the outer winding to which power is supplied.

In this type assembly, shorted turns are a possibility. However, such a condition is easily detected by holding the coil assembly in front of a strong light where the position of each turn may be readily observed. Correcting such a fault may be simply accomplished by moving the entire coil or the offending turn slightly on the Teflon support rings and allowing the spring winding to assume its natural shape. After the application of the insulators 2, 3, 5 and 6 and the windings 4 and 7, the assembly is mounted on the Bakelite base 8 and held in place by a thumb screw and plastic clamping bar 9. Connections are then made to tapered pins 10 extending through the base mounting. The ends of the inner coil 4 may be formed into two turn loops of small diameter to hold tightly when pushed over the connected tapered pins 10. The heavy outer coil 7 can be formed in like manner. However, there is generally sufficient spring tension stored in the outer coil winding 7 to make a firm contact by means of hooks shaped on the winding ends. The entire assembly can be accomplished without tools in less than four minutes.

Although the invention has been described with reference to particular embodiments it will be understood to those skilled in the art that the invention is capable of a variety of alternative embodiments within the spirit and scope of the appended claims.

I claim:

1. In a magnetic testing device for the successive testing of a series of rigid, one-piece rings of magnetic material, the combination of preformed helical electrical conductors whose turns are internally stressed to maintain the successive helical convolutions in concentric relation to the circular axis of the ring to be tested, and a slippery insulator material to facilitate the threading of said preformed helical conductors around said successively tested rings.

2. The combination as described in claim 1, wherein said insulator material is in the form of concentric rings which separate said helical conductors from each other and from the ring being tested.

3. The combination as described in claim 1 wherein said insulator material is in the form of a coating on said preformed helical electrical conductors.

4. In a magnetic coil structure, the combination of a pair of preformed helical electrical conductors whose turns are internally stressed to maintain the helical form, and means including a rigid, one piece ring to facilitate the threading of one of said conductors about the other in concentric structural relationship, one to the other, and with the centers of their successive helical turns disposed on the circular axis of said one-piece ring.

5. In a magnetic coil structure, the combination of a pair of concentric rings of dielectric material, and a preformed helical electrical conductor whose successive turns are internally stressed to maintain the helical form, and to facilitate their being threaded about said pair of concentric rings, to cause said helical conductor to assume an annular contour embracing both said concentric rings, in which contour the successive turns of said helical conductor are disposed on the circular axis of said ring.

6. In a magnetic coil structure, the combination of a ring of dielectric material, a first preformed helical electrical conductor whose turns are internally stressed to maintain the helical form and to facilitate their being threaded about said ring, a second helical conductor, and means including a second ring of dielectric material having concentricity with said first-named ring to facilitate threadng said second helical conductor about said first helical conductor.

References Cited in the file of this patent

UNITED STATES PATENTS

| | | |
|---|---|---|
| 359,205 | Curtis et al. | Mar. 8, 1887 |
| 1,570,948 | Crouch | Jan. 26, 1926 |
| 1,695,679 | Berlowitz | Dec. 18, 1928 |
| 1,699,661 | Freeburg | Jan. 22, 1929 |
| 1,994,534 | Robinson | Mar. 19, 1935 |
| 2,173,096 | Campbell | Sept. 19, 1939 |
| 2,511,230 | Wald | June 13, 1950 |
| 2,674,031 | Buhrendorf | Apr. 6, 1954 |